Patented May 1, 1951

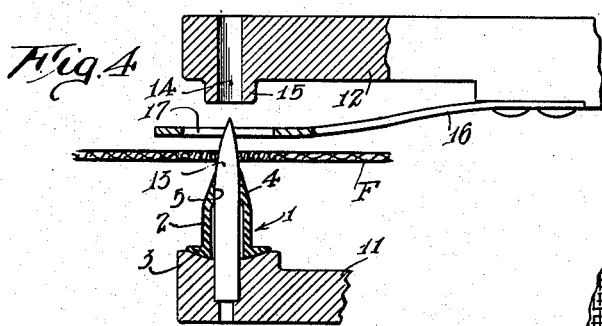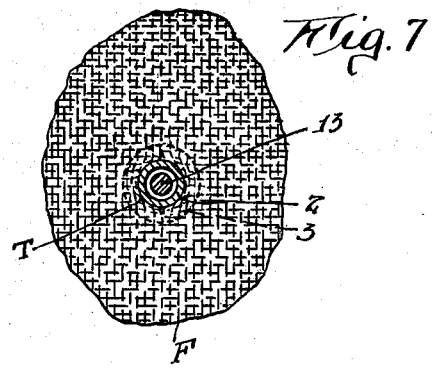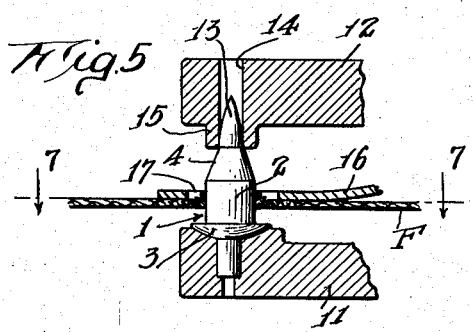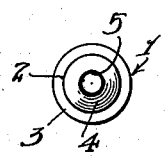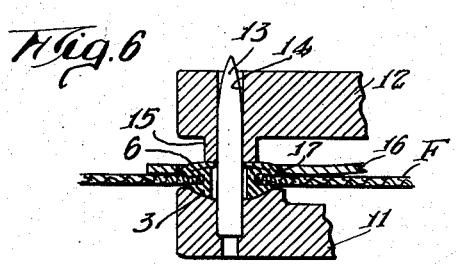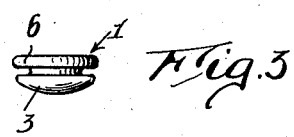

2,550,788

UNITED STATES PATENT OFFICE 2,550,788

EYELET AND METHOD OF SECURING THE SAME

Jan de Swart, Los Angeles, Calif., assignor, by mesne assignments, to Shellmar Products Corporation, Mount Vernon, Ohio, a corporation of Delaware Application December 12, 1944, Serial No. 567,864

2 Claims. (Cl. 24—141)

1

My invention relates to grommets or eyelets and to means and method of securing the same. Among the objects of my invention are:

First, to provide a grommet or eyelet which is particularly designed for manufacture from plastic material.

Second, to provide a grommet or eyelet for attachment to fabric together with a means and method of securing the same, wherein the threads of the fabric are not broken in the course of securing the grommet but instead are spread apart in such a manner as to form a reinforcing of such threads around the shank of the grommet.

Third, to provide a means and method of securing to fabric, eyelets of tubular form, wherein the threads of the fabric are first spread apart, the eyelet inserted in the opening thus formed, and the shank of the eyelet upset or deformed to form a head.

Fourth, to provide an eyelet which may also serve as a rivet or similar securing device for permanently attaching several pieces of cloth together, or to secure cloth to metal or other sheet material.

With the above and other objects in view as may appear hereinafter, reference is directed to the accompanying drawings, in which:

Fig. 1 is an end view of my eyelet before being attached.

Fig. 2 is a side elevational view thereof.

Fig. 3 is a similar side elevational view thereof, showing the button in the form it takes upon being attached.

Fig. 4 is a fragmentary sectional view of my means for attaching the eyelet, and showing the initial step in the method employed for attachment.

Fig. 5 is a similar fragmentary sectional view illustrating the intermediate step in the process of attaching the eyelet.

Fig. 6 is a similar fragmentary sectional view illustrating a final step in the process.

Fig. 7 is a transverse sectional view taken through 7—7 of Fig. 5 showing the manner in which the threads of the fabric are spread rather than severed in the course of inserting the eyelet.

The grommet or eyelet which is the subject of this invention is represented generally by 1 and comprises a tubular shank 2 and a head or flange 3. The extended end of the shank 2 is tapered as indicated by 4, or may be oval or rounded in form. The bore of the shank is reduced in diameter at the tapered end as indicated by 5, and the tapered end preferably forms a relatively sharp edge around the periphery of the reduced bore 5.

The eyelet is preferably molded of plastic material capable of being deformed without rupture.

The shank 2 is adapted to be crushed or deformed axially to form a second head 6 coacting with the head 3 to grip a fabric or other material in which the eyelet has previously been inserted.

The means whereby my eyelet is secured to fabric or the like, includes a pair of coacting jaws 11 and 12 which are adapted to be moved to and from each other by any suitable means but adapted to maintain the jaws in parallelism. The jaw 11 is provided with a pointed pin or mandrel member 13 which is adapted to enter a socket or bore 14 provided in the jaw 12. An upsetting boss 15 is provided around the hole or socket 14. A spring 16, preferably a leaf spring having an opening 17, is secured to the jaw 12 and extends over the boss 15 with its opening 17 in registry therewith and adapted to fit over the boss when the spring is urged against the jaw 12.

The mandrel 13 is adapted to receive slidably the shank 2 of the eyelet 1 with the head 3 of the eyelet resting against the jaw 11. The method whereby my eyelet is secured to fabric, consists essentially in the following steps: The eyelet is placed on the mandrel 13 so that the point of the mandrel forms in effect a continuation of the tapered end 4. The jaws 11 and 12 are brought together, or the mandrel 13 is otherwise caused to pierce the fabric to which it is desired to secure the eyelet. It should be noted as shown best in Fig. 7, that the threads T which comprise the fabric F are not broken by the mandrel 13, but instead are spread apart and compacted around the mandrel. As the jaws 11 and 12 are brought together, the spring 16 aids in forcing the fabric over the tapered end 4 and onto the shank 2 of the eyelet. Continued movement of the jaws 11 and 12 causes the mandrel 13 to enter the socket or bore 14 and the upsetting boss 15 to bear against the tapered extremity of the shank. Sufficient pressure is then exerted by the jaws 11 and 12 to deform the shank 2. It should be noted that except for the reduced portion 5, the shank 2 is spaced from the mandrel 13 and is therefore unsupported and can be readily deformed by the compressive force exerted by the jaws 11 and 12. In so doing, the intermediate portion of the shank is forced radially outwardly to form the second head 6, as shown in Figs. 6 and 3. The opening 17 in the spring 16 is large enough to clear the second head thus formed.

Many other embodiments of the invention may be resorted to without departing from the spirit of the invention.

I claim:

1. A method of securing to a woven fabric a plastic eyelet having a head and a hollow shank provided with a tapered end, characterized by: inserting a pointed tool into and through said eyelet; wedging the tool and the shank of the eyelet between the threads of the fabric to spread the threads for the accommodation of said shank; then axially deforming said shank while holding the same on said tool to form a second head for cooperation with the initial head to secure the fabric therebetween.

2. An eyelet of deformable plastic material which is adapted to be secured in an aperture provided by spreading the threads of a woven fabric, said eyelet comprising a head portion and a shank portion, said shank portion being provided with a bore having a relatively small portion of reduced cross section adjacent the outer end thereof, and said shank being tapered at the outer end to a relatively sharp edge around the periphery of the bore, said shank portion being adapted to be inserted in said aperture and being axially deformable to provide a second head for cooperation with said first mentioned head to grip the fabric therebetween and securely attach the eyelet to the fabric.

JAN DE SWART.

REFERENCES CITED

The following references are of record in the file of this patent:

UNITED STATES PATENTS

| Number | Name | Date |
|---|---|---|
| 743,909 | Mitchell | Nov. 10, 1903 |
| 1,122,280 | Kempshall | Dec. 29, 1914 |
| 1,499,625 | Miller et al. | July 1, 1924 |
| 2,071,507 | Dews | Feb. 23, 1937 |
| 2,175,198 | Klein | Oct. 10, 1939 |
| 2,343,982 | Knowlton | Mar. 14, 1944 |

FOREIGN PATENTS

| Number | Country | Date |
|---|---|---|
| 1,007 | Great Britain | of 1865 |
| 29,115 | Great Britain | of 1910 |
| 410,423 | Great Britain | May 17, 1934 |
| 465,570 | France | Feb. 9, 1914 |